United States Patent [19]
Jean

[11] 4,296,162
[45] Oct. 20, 1981

[54] WALLCOVERINGS

[76] Inventor: Raymond W. Jean, 90 LaSalle St., New York, N.Y. 10027

[21] Appl. No.: 103,211

[22] Filed: Dec. 13, 1979

Related U.S. Application Data

[63] Continuation-in-part of Ser. No. 886,512, Mar. 14, 1978, Pat. No. 4,205,110.

[51] Int. Cl.³ .................. B32B 7/00; B32B 15/04; B32B 15/20
[52] U.S. Cl. .................. 428/213; 428/216; 428/246; 428/285; 428/354; 428/906
[58] Field of Search ........... 428/138, 246, 248, 213, 428/255, 285, 444, 310, 313, 314, 315, 511, 195, 196, 197, 203, 204, 209, 211, 354, 215, 216, 906

[56] References Cited

U.S. PATENT DOCUMENTS

| | | | |
|---|---|---|---|
| 2,151,024 | 3/1939 | Gilbert | 428/444 |
| 2,226,589 | 12/1940 | Smyers | 428/248 |
| 2,699,417 | 1/1955 | Repsher et al. | 156/310 |
| 2,702,580 | 2/1955 | Bateman | 156/310 |
| 2,726,977 | 12/1955 | See et al. | 428/138 |
| 3,484,335 | 12/1969 | Wismer et al. | 428/315 |
| 3,511,335 | 5/1970 | Uddenborg | 428/511 |
| 4,039,709 | 8/1977 | Newman | 428/354 |
| 4,054,710 | 10/1977 | Botsolas | 428/246 |
| 4,055,699 | 10/1977 | Hsiung | 428/313 |
| 4,096,304 | 6/1978 | Greengrass | 428/255 |
| 4,121,958 | 10/1978 | Koonts | 428/314 |

FOREIGN PATENT DOCUMENTS

| | | | |
|---|---|---|---|
| 900876 | 7/1962 | United Kingdom | 428/315 |
| 1380527 | 1/1975 | United Kingdom | 428/314 |

Primary Examiner—William J. Van Balen
Attorney, Agent, or Firm—Brumbaugh, Graves, Donohue & Raymond

[57] ABSTRACT

A thin, flexible covering material which provides a heat and vapor barrier for walls or ceilings comprises a first layer of vinyl, fabric, or wallpaper onto which a decorative design may be printed, a second layer of aluminum foil, and a third layer of backing paper, fabric, confill or scrim, the layers being laminated together to form the covering material.

3 Claims, 1 Drawing Figure

WALLCOVERINGS

The present application is a continuation-in-part of U.S. application Ser. No. 886,512, filed Mar. 14, 1978, now U.S. Pat. No. 4,205,110.

BACKGROUND OF THE INVENTION

The present invention relates to energy efficient surface covering materials primarily for application to walls of living spaces for reducing heat and vapor transmission through the wall and which are sturdy, durable, flame resistant, and esthetically pleasing.

Known wallpaper compositions are commonly applied to change and enhance the esthetic effect of the space, however, such materials have little value as heat insulators, or in providing a vapor barrier, or in furnishing any flame resistance characteristics to the covered surface. When it is desired to insulate a room, materials such as rock wool or fiberglass insulation, or particulate or foam insulations, are installed inside the wall spaces. However, in a building which has already been completed, it is difficult and expensive to install such insulating materials. Furthermore, such materials contribute no esthetic effect to the living space and indeed may detract from the esthetic effect if substantial alteration of a wall is necessary in order to install the desired insulation material.

There is currently sold one type of specialized wallcovering which offers some heat and moisture insulation. This wallcovering material consists of an aluminized mylar base with a layer of backing material on one side. The aluminized mylar base is a unitary composition of transparent polyester film on either side of a vapor deposit aluminum. The shiny outer metallic surface is partially inked over to form a decorative design.

SUMMARY OF THE INVENTION

The present invention is an energy efficient wallcovering which in its preferred embodiments is simpler in construction and more effective in providing a heat and moisture barrier than the aforedescribed aluminized mylar covering. The cooperation of layers provides a strong, flexible covering, and permits the use of the aluminum as a moisture barrier in spite of the low tear resistance of aluminum foil itself, without having to use an aluminized mylar or other compound sheet material. Moreover, in the present invention, a separate layer, i.e. a sheet of aluminum foil, is used to provide a better and more uniform moisture and radiant energy barrier. The wallcovering according to the present invention affords both esthetic adaptability and a significant degree of control of heat and vapor transmission through a covered surface. The material is at the same time durable, wear and tear resistant, and flame resistant, and may be applied in the same way as conventional wall coverings such as wallpaper to provide similar esthetic effects. When installed, the material also provides a permanent vapor barrier and radiant heat barrier which provides noticeable savings in energy costs to the user.

More particularly, the present invention provides several embodiments of surface coverings or structural material for use inside buildings, each embodiment furnishing a unique combination of properties including resistance to the passage of heat and vapor into or out of a room or other space in which the invention has been installed. The embodiments include several layers laminted together to form a composite, unitary material.

According to the invention, a wallcovering is formed of a composite material comprising a first layer of vinyl wallcovering fabric or paper as the exposed surface of the covering, a second layer of metal foil, in particular aluminum foil, and a backing layer of fabric, paper, confill, scrim or the like. Additional optional layers of paper or fabric, polymeric foam, fiberglass, or mineral wool may be incorporated between the vinyl layer and the foil layer, or may be added onto the 3-layer structure by lamination to the backing layer.

BRIEF DESCRIPTION OF THE FIGURE

The FIGURE is a schematic view of a composite layered wallcovering.

DETAILED DESCRIPTION OF THE PREFERRED EMBODIMENTS

Figure 1:
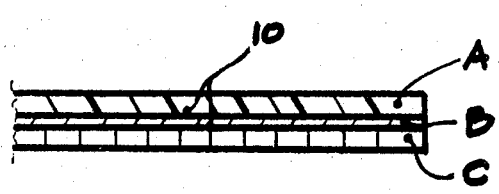

The invention comprises a composite material of several layers laminated together, which material not only provides esthetic adaptability, in that the covering material may be given any desired colors or designs, but also possesses economic value through the physical properties of the material. Specifically, the invention provides a permanent vapor barrier and radiant heat transfer barrier in material which is simultaneously durable, wear, tear and abrasion resistant, and flame resistant. The material, even in the embodiments in which it is in a flexible, thin form, is unusually strong and handleable and can easily be applied with techniques analogous to those in use for previously known wall covering materials.

FIG. 1 shows the composition of a composite wall covering or ceiling covering in accordance with the present invention. The outer layer, layer A, is a vinyl sheet, having a thickness of 3 to 5 mils. Alternatively, layer A may be a wallcovering fabric or paper material. This layer forms the visible wallcovering surface and thus normally has a decorative design printed thereon. Layer B is a layer of aluminum foil, having a thickness of from 0.00025 to 0.005 inches, and preferably on the order of 0.00035 inches. Layer B may also be an aluminized mylar base, which although not preferred, may in accordance with the present invention be converted into part of the general purpose wallcovering. Layer C is a backing layer of fabric paper, confill, scrim or the like, and as such may be applied to a wall in the conventional manner.

Although the material is described as a wallcovering, the material may have other applications, some of which are described herein. Accordingly, the term wallcovering is to be understood to refer also to such applications where appropriate. As the visible outer layer, known wallcovering fabrics or papers in customarily available thicknesses may be employed. Where the outer layer is vinyl, a vinyl sheet of any known, opaque sheet or film, having a thickness of from about 3 to 5 mils, may be employed. The foil referred to is aluminum foil having a thickness of from 0.00025 to 0.005 inches, and preferably on the order of 0.00035 inches. Aluminum is preferred as a foil material in view of availability and cost factors, its handleability as a thin foil, and its relatively good reflectivity properties of incident radiation. Thus, while other foils, such as gold or copper, may be employed, they are for the most part cost prohibitive. The paper backing depicted in the FIGURE or used as additional layers may be any conventional paper, such as craft paper, and may be of a grade and thickness customarily used in wallpaper. As polymeric foam, polyethylene foam is suitable. The terms "fiberglass", "mineral wool", and "wood, plywood or composition board" define substances which are well-known.

While the composition depicted in FIG. 1 constitutes the preferred embodiment of this invention, additional layers of materials may be included, as set forth in greater detail in the aforementioned U.S. application Ser. No. 886,512. For example, a layer of paper having the thickness of conventional wallpaper may be incorporated between layers A and B. In addition, layers of polymeric foam, such as polyethylene foam, or fiberglass or mineral wool, may be incorporated into the composite covering material, either between layers A, B and C, or incorporated as additional outside layers to form materials for ceiling coverings, windows with blinds, and floor coverings. Such applications are described in greater detail in Application Ser. No. 886,512, which is incorporated herein by reference.

The wall and ceiling covering described herein may be made and sold in rolls from which the user may cut successive strips which are to be applied side by side to a wall or ceiling, in the manner customarily used for wallpaper. The vinyl layer A of FIG. 1 is visible to the user after the material is put into place, and this layer can be given a decorative design, which can be repetitive or which can form in conjunction with adjacent strips a single figure or picture on a wall or ceiling. The covering material can be put into place by customary methods, such as by applying a permanent, non-injurious adhesive to the surface C of FIG. 1, and contacting the adhesive-laden surface with a portion of a suitably prepared wall or ceiling.

All of the embodiments of the present invention described or discussed above may be constructed by laminating together the various layers of material which together form the composite material of the present invention. The techniques and materials used for the laminating will be evident to one of ordinary skill in that art. One would recognize, for instance, that the layers of adhesives 10 used to unite adjacent layers of the composite material should be capable of forming a permanent bond, should not be injurious or corrosive to the bonded layers of the composite material, and in order to form the unitary composite structure, should be co-extensive with the facing surfaces of the respective layers.

Surface coverings in accordance with the present invention provide a unique combination of properties. The coverings furnish a vapor barrier, which provides several advantages not available in ordinary wallpaper. The vapor barrier decreases heat transmission through a wall which has a covering of the present invention. The vapor barrier permits a particular level of comfort to be maintained at a lower room temperature, even when the surrounding atmosphere is excessively humid. The vapor barrier is particularly useful in laboratories or hospitals because it makes much easier the control of temperature and humidity in a room environment, and because it prevents the undesired entry of vapor which may carry contaminants.

The coverings of the present invention also act as a significant barrier to the transmission of radiant heat. Thus, when the external environment is below the temperature of a living space in which coverings of the present invention have been put into place, a surface covering of the present invention will cause the space to retain as much as 80 to 95% of the heat which would otherwise be radiated to the external atmosphere. Similarly, when the external atmosphere is hotter than the enclosed living space, as much as 95 to 97% of the heat which would otherwise be radiated into the enclosed space is kept out.

The combined effects of the vapor barrier and radiant heat barrier will conserve the energy that will otherwise be necessary to regulate the humidity and temperature of an enclosed living space, resulting in savings which can be on the order of 10% in the cost of heat and 5% in the cost of electricity for cooling necessary for such regulation.

The composite materials of the present invention also provide a combination of properties which makes them especially useful as construction or decoration materials. The particular combinations described hereinabove provide a composite material which is easily handleable, washable, and wear and tear resistant both in handling and once applied to the wall. The material also has acceptable ratings as to fire resistance, which makes it even more preferable for use in decorating or redecorating living spaces. The materials of the present invention combine these advantages with the feature that when desired the visible surface can be provided with various designs. Thus, the composite covering material of the present invention combines the esthetic adaptability necessary for such material with physical properties which make the present invention an economically valuable product.

The invention has been described and illustrated with reference to certain preferred embodiments thereof. Variations and modifications will be apparent to persons skilled in the art without departing from the inventive principles disclosed herein. All such modifications and variations are intended to be within the scope of the invention as set forth in the following claims.

I claim:

1. Flexible, unitary, multi-layer surface wallcovering material consisting of an outer layer of opaque vinyl having a thickness of 3 to 5 mils, a second layer of aluminum foil having a thickness of 0.00025 to 0.005 inches, a backing layer of material selected from the group consisting of paper, fabric, confill and scrim, and an adhesive layer between said first and second layers and said second and backing layers, wherein said adhesive is continuous and co-extensive with each adjacent layer such that said layers are laminated together to form a unitary composite structure.

2. Wallcovering material according to claim 1, wherein said backing layer is paper.

3. A moisture and radiant heat barrier on a wall of a room, for insulating said wall, consisting of an outer, decorative layer selected from the group consisting of opaque vinyl having a thickness of 3 to 5 mils, wallcovering fabric, and wallcovering paper, a second layer of aluminum foil having a thickness of 0.00025 to 0.005 inches, said second layer being bonded to said outer layer at an interface consisting of an adhesive layer continuous and co-extensive with said decorative and second layers, a backing layer of material selected from the group consisting of paper, fabric, confill and scrim, said backing layer being bonded to said second layer at an interface consisting of an adhesive layer continuous and co-extensive with said backing and second layers, and adhesive means between said backing layer and said wall for bonding said backing layer to said wall to expose said decorative layer.

* * * * *